United States Patent
Hansson

(10) Patent No.: US 8,195,202 B2
(45) Date of Patent: Jun. 5, 2012

(54) DEVICE AND METHOD FOR AGPS HIGH ACCURACY POSITIONING IN UNKNOWN CELL AREAS

(75) Inventor: Andreas Hansson, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 389 days.

(21) Appl. No.: 12/623,668

(22) Filed: Nov. 23, 2009

(65) Prior Publication Data

US 2010/0178932 A1    Jul. 15, 2010

Related U.S. Application Data

(60) Provisional application No. 61/117,816, filed on Nov. 25, 2008.

(51) Int. Cl.
*H04W 24/00*    (2009.01)

(52) U.S. Cl. ............... 455/456.5; 455/456.1; 455/456.2; 455/456.3; 455/456.4; 455/456.6; 455/457; 455/440; 342/357.43

(58) Field of Classification Search ............... 455/404.2, 455/440, 456.1, 456.2, 456.3, 456.4, 456.5, 455/456.6, 457; 342/357.43
See application file for complete search history.

(56) References Cited

U.S. PATENT DOCUMENTS

| | | | |
|---|---|---|---|
| 6,433,735 B1 * | 8/2002 | Bloebaum et al. | 342/357.43 |
| 7,688,260 B2 * | 3/2010 | Pomerantz et al. | 342/357.43 |
| 2005/0122259 A1 * | 6/2005 | Sairo et al. | 342/357.1 |

* cited by examiner

*Primary Examiner* — Anthony Addy
*Assistant Examiner* — Shahriar Behnamian
(74) *Attorney, Agent, or Firm* — Coats & Bennett, P.L.L.C.

(57) ABSTRACT

The present invention relates to Assisted Global Positioning System (AGPS) high accuracy positioning in unknown cell areas. By using an approach of three alternative steps a reference position, needed for AGPS positioning, is determined. The first step involves using the location of any neighboring cell. The second involves using the location of a cell within the same Location Area as the cell serving the portable communication device to position. The third step comprises determining a fixed point within the same geographical area as the Serving Mobile Location Center (SMLC) is serving, and using this fixed point as a reference location. Using the three-step approach the AGPS positioning can be optimized, providing a possibility to position, for instance a mobile phone, by AGPS even though the location of the cell serving the phone is unknown to the positioning node operating the serving cell.

20 Claims, 5 Drawing Sheets

DEVICE AND METHOD FOR AGPS HIGH ACCURACY POSITIONING IN UNKNOWN CELL AREAS

RELATED APPLICATIONS

This application claims priority from the U.S. provisional patent application identified by App. No. 61/117,816, which was filed on 25 Nov. 2008.

TECHNICAL FIELD

This invention pertains in general to the field of positioning. More particularly the invention relates to Assisted Global Positioning System (AGPS) high accuracy positioning and more particularly to AGPS high accuracy positioning in unknown cell areas.

BACKGROUND

Location Services (LCS) is becoming more and more used by operators and governments today.

Assisted Global Positioning System (AGPS) provides the highest accuracy of all methods available for positioning of a portable communication device such as a Mobile Station (MS) or User Equipment (UE) today. AGPS uses mobile network data combined with satellite data to assist the trilateration of satellites enabling the determination of a position fix. The accuracy of an AGPS position is typically within 10-15 m of ground truth.

There are however situations where insufficient knowledge of the mobile network cell structure makes AGPS less accurate or fail completely. This is especially true for disaster areas where infrastructure has been damaged and temporary mobile base stations must be taken into use.

This disclosure is an attempt to enhance the success rate of AGPS usage in such situations.

Compared to stand-alone handheld Global Positioning System (GPS) devices, a mobile phone carries a smaller GPS antenna and has much less battery capacity to use for GPS measurements. In order to use the integrated GPS chip only during a positioning attempt, i.e. only during limited times, the chip needs to acquire satellite signals very fast. The mobile phone cannot afford to scan the whole sky to obtain signals from relevant satellites since it would take too long a time and the power consumption of repeated scans would deplete the relatively small battery. The mobile needs help to only scan a smaller part of the sky where signals from satellites detectable from its current location can be acquired.

Therefore, AGPS positioning needs a reference location of where the UE is in order to obtain a search window in the sky where to find satellites detectable given the reference location. The reference location may however be a rough estimate of where the UE is. The reference location can be crucial to the algorithms that calculate the AGPS position, since the calculations are in part done by an iterative Taylor search that needs a starting point. The closer the starting point is to the actual true position, the faster the position fix can be determined. In AGPS terms, the required time to determine a position fix is called Time To First Fix (TTFF). The determination of a proper reference location is therefore one of the key elements in obtaining an AGPS position. It must not be too inaccurate or the AGPS measurements will fail and no position fix can be determined.

The reference location normally used today in AGPS solutions is the location of the Base Transceiver Station (BTS) serving the UE at the time of the positioning attempt. Using its location, the UE knows where to start its measurements and where to acquire satellites. This gives much less battery consumption, and enables higher sensitivity of the chipset for more accurate measurements.

The location of the serving BTS or Node B is typically taken from the cell data distributed by the Operations Support System (OSS) and used by a positioning system for a range of purposes, one being the distribution or usage of reference locations during AGPS positioning.

The OSS is feeding the positioning system with network data continuously. However, keeping the network data updated is not an easy task for today's large networks, which may be in scales of hundreds of thousands cells or more. Since the OSS load cycle can take several days to complete, a change in the cell network structure might not be reflected at once. Without updated network data, an accurate reference location cannot be obtained for AGPS, causing the positioning to fail. The result is loss of AGPS capability in the unknown cell areas and reduced yield of the AGPS service in general.

Many chipsets used in UEs today require a reference location accurate within less than 100 km, or they will face severe problems, i.e. typically fail completely. Therefore the reference location must be chosen wisely. Without useful network data this becomes increasingly difficult.

Feeding of updated network data by the OSS may be a problem in disaster areas and in areas hit by an earthquake, to mention two examples.

In disaster areas this is clearly a problem, since there are often damages to the network infrastructure at the same time as the need of location information for emergency services increases. Search and rescue missions, evacuations, and/or supply deliveries would all benefit from knowing where the people in need are located. Emergency call (911, 112, etc) volumes tend to be high near disaster sites and pinpointing a caller's location can be a matter of life and death.

The risk of an earthquake hitting rural and suburban areas somewhere in the U.S.A. at 8:00 PM, may be higher than we wish. This could in addition result in infrastructural damages involving damages to several BTSs or Node Bs in the network covering the area, causing positioning problems. An operator serving the hit areas would put up mobile temporary base stations with a few hours delay to maintain coverage for emergency calls and normal voice traffic. These temporary sites may however not be reflected in the OSS cell data, since the OSS load cycle can take several days to complete. In addition, they may also be dismantled and moved again before the OSS eventually feeds the positioning system. The BTSs or Node Bs may be highly mobile, for instance mounted on trucks, and are typically placed where needed most at the moment.

People calling 911, 112 or the like from phones served by one of these temporary—and for the OSS and positioning system yet unknown—cells cannot be positioned with any level of accuracy typically produced by positioning systems of today. Positioning with Cell Global Identity (CGI) or Service Area Identifier (SAI) accuracy, that is positioning based on the serving cell location, is made impossible since the location of the mobile BTS or Node B is still unknown to the network. AGPS positioning might fail due to the absence of an accurate reference location, possibly caused by missing cell information.

In the two examples described above, it would not be possible to achieve accurate positioning due to the use of cells, which location is unknown to the position system. These positioning problems may thus occur in areas where emergency positioning may be of outmost importance and AGPS accuracy could save lives.

Thus, there is a need for a novel positioning method enabling high accuracy positioning in cells unknown to the positioning system.

Hence, an improved positioning method would be most advantageous and could thus even save lives of human beings.

SUMMARY

Accordingly, the present invention preferably seeks to mitigate, alleviate or eliminate one or more of the above-identified deficiencies in the art and disadvantages, singly or in any combination, and solves at least the above mentioned problems by providing a positioning node and a method for determining a reference location for cells, the location of which is unknown, according to the appended patent claims.

It is an object of the present invention to provide a reference location for AGPS positioning in cases where the location of the cell serving the device to position is unknown to the positioning system.

According to one aspect of the present invention there is provided a method for providing a reference location estimate for AGPS positioning of a portable communication device when the location of the serving cell of the portable communication device is unknown to the positioning node. The method comprises receiving from the portable communication device via a network node a data list of cells that are neighbors to the serving cell. The method also comprises determining whether the location of any one of the neighbor cells is known to the positioning node, as well as determining whether there is a cell in the data list of cells that has the same Location Area Code (LAC) as the serving cell of the portable communication device, based on whether the location of any one of the neighbor cells is known to the positioning node. Also, a step of identifying a fixed point of location within a geographical area that is being served by the positioning node, is also comprised in the method, based on whether the location of any one of the neighbor cells is known to the positioning node, and based on whether there is a cell in the data list of cells that has the same LAC as the serving cell of the portable communication device. In addition, the method comprises setting the reference location estimate for AGPS positioning of the portable communication device, based at least on whether the location of any one of the neighbor cells is known to the positioning node.

According to another aspect of the present invention there is provided a positioning node for providing a reference location estimate for AGPS positioning of a portable communication device, when the location of the serving cell of the portable communication device is unknown to the positioning node. The positioning node comprises a transceiving unit, a processing unit, and an identifying unit. The transceiving unit is configured to receive a request for a data list of cells that are neighbors to the serving cell, from a network node. The processing unit is configured to determine whether the location of any one of the neighbor cells is known to the positioning node, to determine whether there is a cell in the data list of cells that has the same Location Area Code (LAC) as the serving cell of the portable communication device, based on whether the location of any one of the neighbor cells is known to the positioning node. The identifying unit is configured to identify a fixed point of location within a geographical area that is being served by the positioning node, based on whether the location of any one of the neighbor cells is known to the positioning node, and based on whether there is a cell in the data list of cells that has the same LAC as the serving cell of the portable communication device control unit. Moreover, the processing unit is further configured to set the reference location estimate for AGPS positioning of the portable communication device, based at least on whether the location of the base station of any one of the neighbor cells is known to the positioning node.

The present invention has the advantages over the prior art that the use of a resilient method to determine a reference location would dramatically increase AGPS success rate not only in temporary and/or mobile cells, but also in a normal operator network since OSS load cycles are not efficient in this regard, and several days might pass before a network change is fully reflected in distributed OSS data.

In addition, for disaster areas, determining a useful reference location for AGPS positioning may be critical. The embodiments of the present invention as described herein would greatly enhance success rate of AGPS emergency positioning in said disaster areas, which in turn could save lives.

Of course, the present invention is not limited to the above summary of features and advantages.

BRIEF DESCRIPTION OF DRAWINGS

These and other aspects, features and advantages of which the invention is capable of will be apparent and elucidated from the following description of embodiments of the present invention, reference being made to the accompanying drawings, in which FIG. 1 schematically illustrates an AGPS positioning system related to embodiments of the present invention.

ABBREVIATIONS

AGPS Assisted Global Positioning System
BSC Base Station Controller
BTS Base Transceiver Station
CGI Cell Global Identity
GSM Global System for Mobile communication
LA Location Area
LAC Location Area Code
LCS LoCation Service
MCIL Measured Cell Identity List
MR Measurement Report
MS Mobile Station
OSS Operations Support System
RNC Radio Network Controller
SAC Service Area Code
SAI Service Area Identifier
SAS Stand Alone SMLC SMLC Serving Mobile Location Center
TTFF Time To First Fix
UE User Equipment
UMTS Universal Mobile Telecommunications System

DETAILED DESCRIPTION

The deviation in position between a chosen AGPS reference location and the actual location of the mobile device to position, i.e. the accuracy of the AGPS reference location, has a direct impact on the AGPS success rate, the Time To First Fix (TTFF, and the accuracy of the first fix position of the positioning.

Chipsets used in mobile platforms today can start deteriorating in terms of quality of service proportional to the inaccuracy of the given reference location. If the reference location is more than typically 100 km off target some chipsets can stop working completely. Also, service degradation might in practice damage AGPS usage long before this limit is reached, depending on chipset performance.

To increase the yield of AGPS positioning in cells, the location of which is unknown to the positioning system, embodiments of the present invention focus on determining an estimate of the reference location, based on other pertinent location information. In order to set the reference location with the highest possible reference location accuracy, a three-step approach is herein presented.

Figure 1:
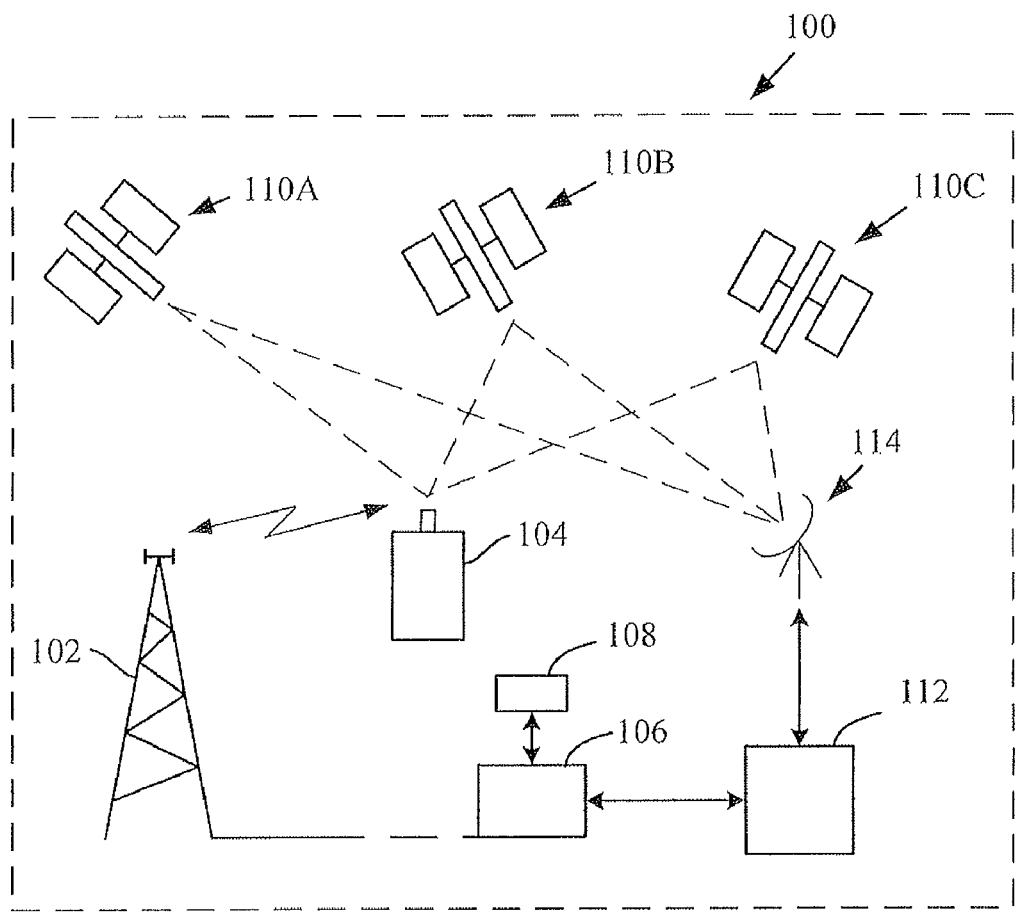

FIG. 1 schematically illustrates an Assisted Global Positioning System (AGPS). The positioning system 100 typically comprises a Base Transceiver Station (BTS) or Node-B 102, a portable communication device 104, such as a mobile phone, a Base Station Controller (BSC) or a Radio Network Controller (RNC) 106, a general measurement unit 108, GPS satellites 110A-C, a positioning node 112, and a dedicated satellite signal antenna 114.

By assisting an AGPS unit within a portable communication device with positioning information, a positioning node can calculate which satellites the mobile phone can detect, based on an estimated location of the base station serving the portable communication device and based on satellite ephemeris almanac information available to the positioning node. Based on an estimate where the portable communication device resides and knowledge about which satellites the portable communication device can detect, it is sufficient to scan only a smaller part of the sky where signals from satellites detectable from its current location can be acquired.

A positioning node that can determine a reference location needed by the AGPS positioning system of the portable communication device, according to the three-step approach is now presented.

Figure 2:
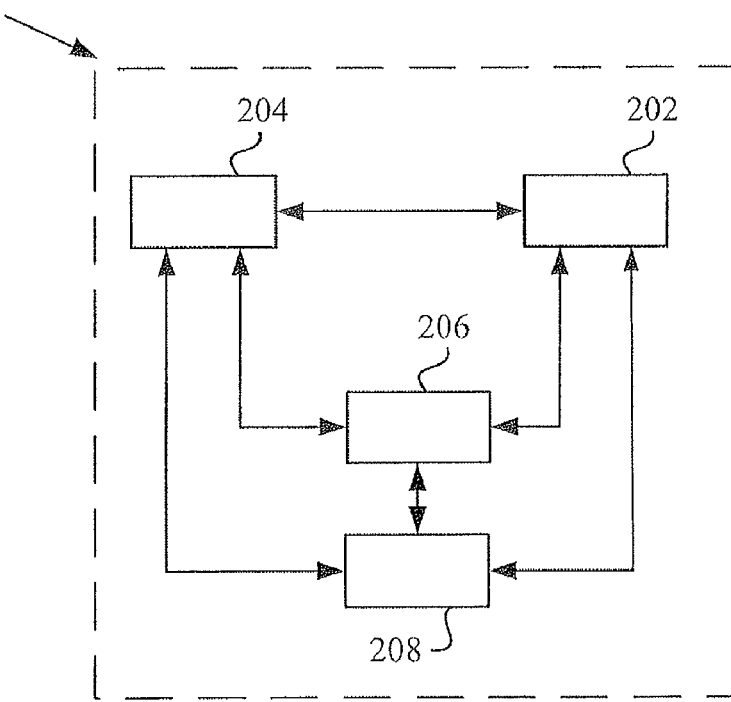
FIG. 2 schematically illustrates a positioning node according to some embodiments of the present invention.

FIG. 2 is a schematic illustration of such a positioning node 200 according to some embodiments of the present invention. The positioning node 200 may comprise a transceiver unit 202, an identifying unit 204 and a processing unit 206, connected to each other. In addition, a control unit 208 can be comprised in the positioning node 200.

The transceiving 202 is configured to receive a request for a data list of cells that are neighbors to the serving cell, from a network node such as a Radio Network Controller (RNC) or a Base Station Controller (BSC).

The processing unit 206 may be configured to determine whether the location of any one of the neighbor cells is known to the positioning node, to determine whether there is a cell in the data list of cells that has the same Location Area Code (LAC) as the serving cell of the portable communication device, based on whether the location of any one of the neighbor cells is known to the positioning node.

The identifying unit 204 can be configured to identify a fixed point of location within a geographical area that is being served by the positioning node, based on whether the location of any one of the neighbor cells is known to the positioning node, and based on whether there is a cell in the data list of cells that has the same as the serving cell of the portable communication device control unit.

The processing unit 206 can further be configured to set the reference location estimate for AGPS positioning of the portable communication device, based at least on whether the location of any one of the neighbor cells is known to the positioning node.

Figure 3:
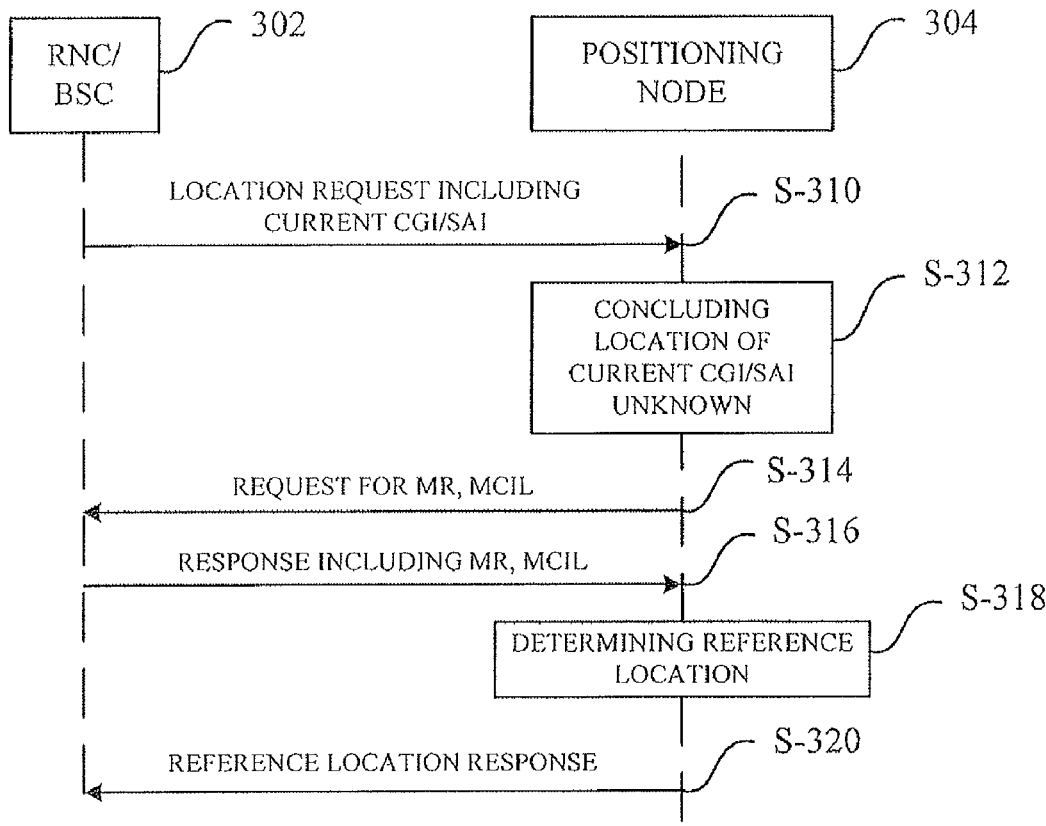
FIGS. 3 and 4 illustrate a signal diagram involving a positioning system according to some embodiments of the present invention.
Figure 4:
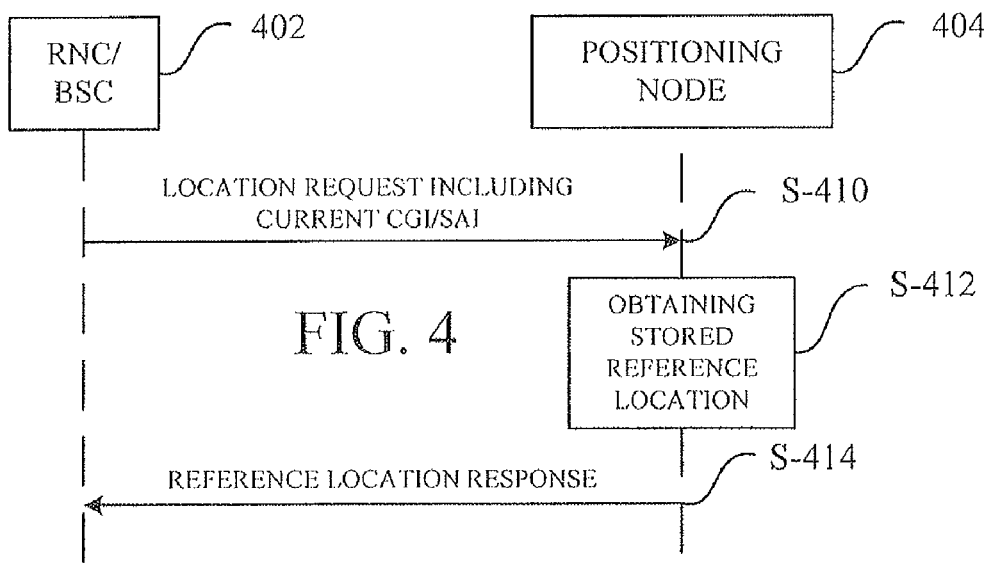

FIGS. 3 and 4 depict signal diagrams of communication between a RNC/BSC 302, 402 and a positioning node 304, 404. FIG. 3 relates to a method for determining a reference location, whereas FIG. 4 relates to the usage of an earlier determined and stored reference location.

In step S-310, the positioning node 304 receives a location request including the current Cell Global Identity (CGI) or the serving area identifier (SAI) of serving cell from the Radio Network Controller (RNC) or the Base Station Controller (BSC). The positioning node 304 can then evaluate the CGI or SAI and conclude that the location of said CGI or SAI is unknown to the positioning node 304, step S-312. For this reason, the positioning node 304 sends a request for the Measurement Report (MR) and Measured Cell Identity List (MCIL) to the RNC/BSC 302, step S-314. As a response to said request the RNC/BSC can then send a response including the MR and MCIL to the positioning node 304, step S-316. Based on the signal strength report from each base station in the MR and the list of cells which the UE can detect, in MCIL, the positioning node 304 can then determine the reference location of the UE, step S-318. After having determined the reference location for the mobile phone of the serving cell, this report is then sent to the UE via the RNC/BSC in step S-320.

The first signaling step of the signaling diagram in FIG. 4 corresponds to the first signaling step of FIG. 3. Step S-410 is thus receiving a location request including the current CGI and SAI from the RNC/BSC 402. However, the positioning node can now determine whether there is a stored reference location for the serving cell, or not. In case there is such an earlier determined and then stored reference position, the positioning node 404 can obtain said stored reference location in step S-412 to be used in the AGPS positioning of the portable communication device. The reference location can now be sent to the UE via the RNC/BSC in step S-414, as a response to the location request of step S-410.

Figure 5A:
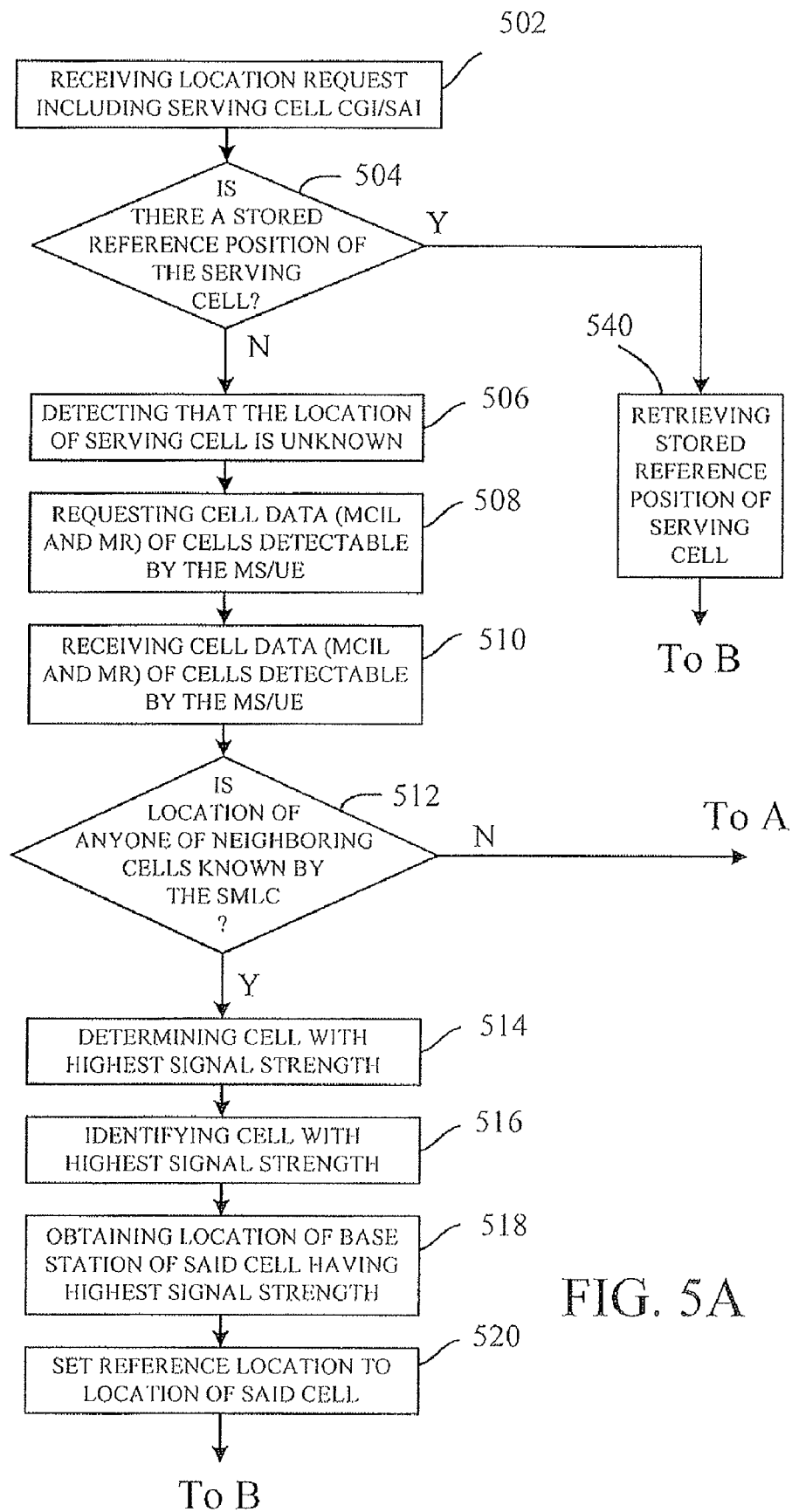
FIGS. 5A and 5B illustrate a flow chart of method steps according to some embodiments of the present invention.
Figure 5B:
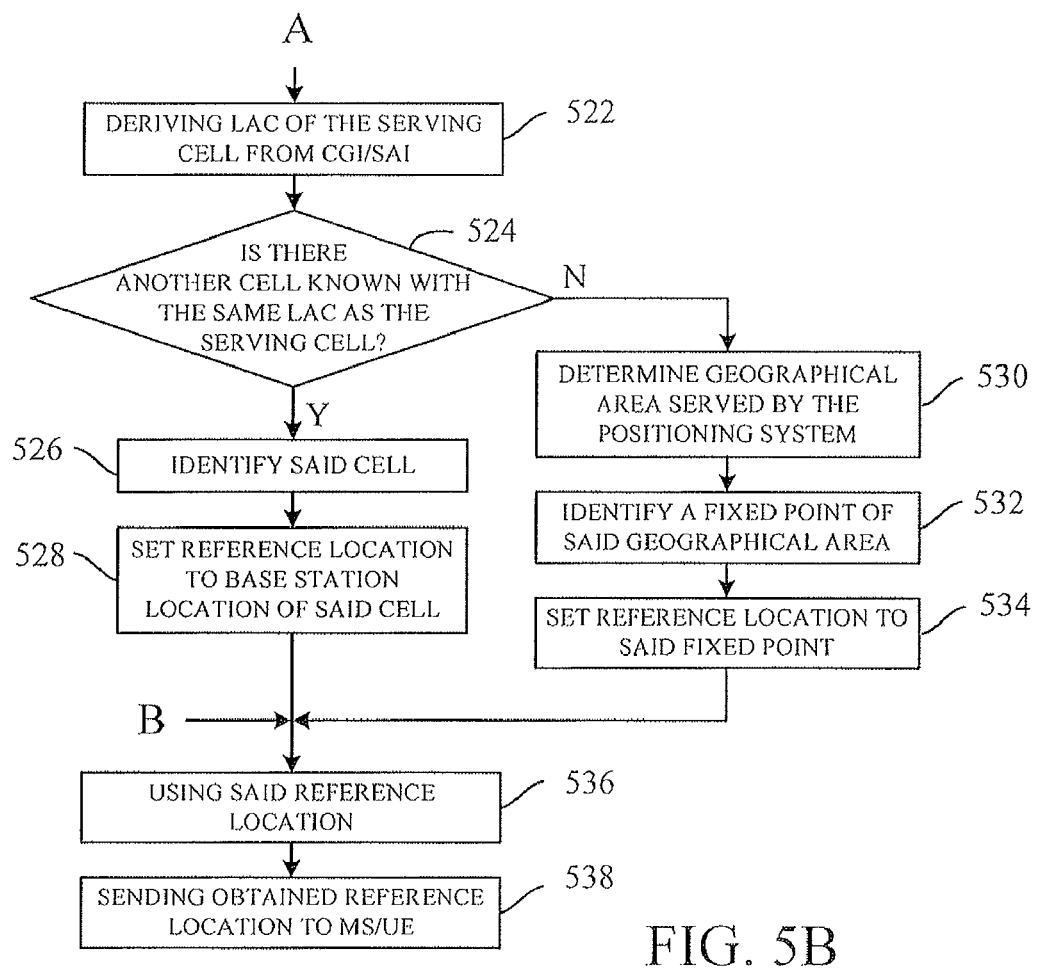

A more detailed description of the three-step approach to determine a reference location will now be presented with reference to FIGS. 5A and 5B illustrating a flow-chart of method steps within a method to provide a reference location.

In step 502, the positioning node receives a location request including the Cell Global Identity (CGI) or the Serving Area Identifier (SAI). This request can be received from a RNC or from the BSC of the serving cell. The request may be initiated by a LoCation Service (LCS) node or may be triggered from the mobile phone that is to be positioned.

Having received the location request, the positioning node now determines whether there is a stored reference position of this serving cell or not in step 504.

If there is in fact a stored reference position for the cell from an earlier determined positioning, this reference location can advantageously be used as the current reference location in order to perform a positioning of the mobile phone residing in the same cell. This alternative path will be described down below.

Step A—Neighbor Cells

However, if there is no stored reference location available for the serving cell as determined in step 504, which may be due that the BTS is mobile and was recently established, the positioning node detects that the location of the serving cell is unknown, in step 506. The cell itself may be identified but the location of it may still be unknown to the positioning node.

In this case the positioning node could be hindered to provide a reference location since the location of the cell in which the mobile phone resides is unknown to the positioning node.

Even though the location of the serving cell is unknown to the positioning node, a reference location can now be provided by using a mechanism of three alternative steps according to embodiments of the present invention.

For the best available reference location when the location of the serving cell is unknown, the closest known neighbor cell can be used. The positioning node can here request cell data in the form of a Measured Cell Identity List (MCIL) and a Measurement Report (MR) which are available to the BSC or the Radio Network Controller (RNC) in step 508. The MCIL comprises a list of cells that the UE can detect or hear, including the serving cell, co-sited cells and external neighbor cells. A portable communication device, UE, also reports the strength of each detected signal as transmitted from the surrounding base stations of other cells. This report is represented by the Measurement Report (MR). This information is available for GSM as well as UMTS networks.

In step 510, the positioning node receives the MCIL and the MR from the Base Station Controller (BSC) or the Radio Network Controller (RNC) for the serving cell.

Figure 6:
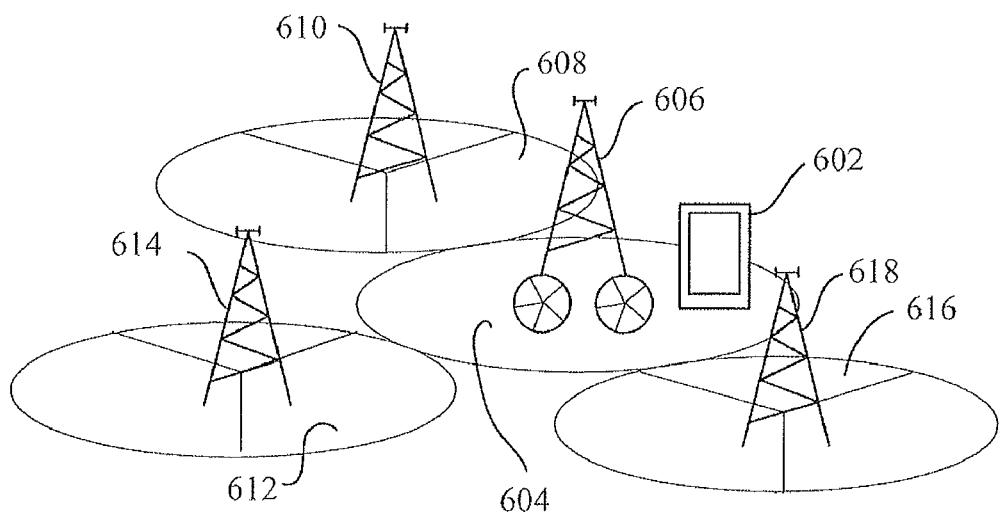
FIG. 6 schematically illustrates a cell plan comprising a mobile cell, at least related to some embodiments of the present invention.

Reference to FIG. 6, illustrating a cell plan, will also be used to further illustrate said step A. The portable communication UE 602 resides in cell 604 and has a serving base station 606. However the location of this cell 604 is unknown to the positioning node.

Having access to information from the MR and the MCIL, the positioning node can now determine whether the location of anyone of the detectable cells is known, or not, in step 512. From the MCIL, the position node gains information that cells 608, 612 and 616 can be detected by the UE.

If the positioning node has information about the location of any cells in the MCIL, i.e. of cells that can be detected, the positioning node can now determine the cell with the highest signal strength, step 514. The cell having the highest signal may be the first cell in the obtained MCIL.

The positioning node thus determines which of the signals as received from the respective base stations 610, 614 or 618 is the strongest. The positioning node now identifies the cell having said strongest signal in step 516, after which the location of the cell having the highest signal strength is obtained in step 518. In FIG. 6 the strongest signal would be transmitted from base station 618 serving cell 616.

The location of base station 618 is then set to the reference position of the serving cell of the UE 602, in step 520, and can therefore be used to perform an AGPS positioning of the UE 602.

The strongest heard cell would typically be the closest neighbor cell and would give an adequate reference location for seamless AGPS service continuation with virtually no loss of performance.

Step B—Location Area (LA)

In the case that the location of neither of the heard cells based on the MCIL are known by the positioning node, or that there are no neighbor cells heard, the Local Area (LA) to which the serving cell belongs can be derived from the CGI or the SAI of the serving cell. The heard cell may be temporary or simply not maintained by Operations Support System (OSS) for which reason the location of the said heard cells can be unknown to the positioning node.

The positioning system scans its cell database for any known cell within the same LA and uses the latitude and longitude of that cell's base station as reference location. This ensures the reference location given is located within the same geographical area. It should be mentioned that the cells within the same LA can be identified by examining the LAC in the CGI or SAI of the cells.

If it is determined in step 512 by the positioning node that the location of neither of the other cells in the MCIL is known, the positioning node can now request or derive the Location Area Code (LAC) of the serving cell, in step 522.

Figure 7:
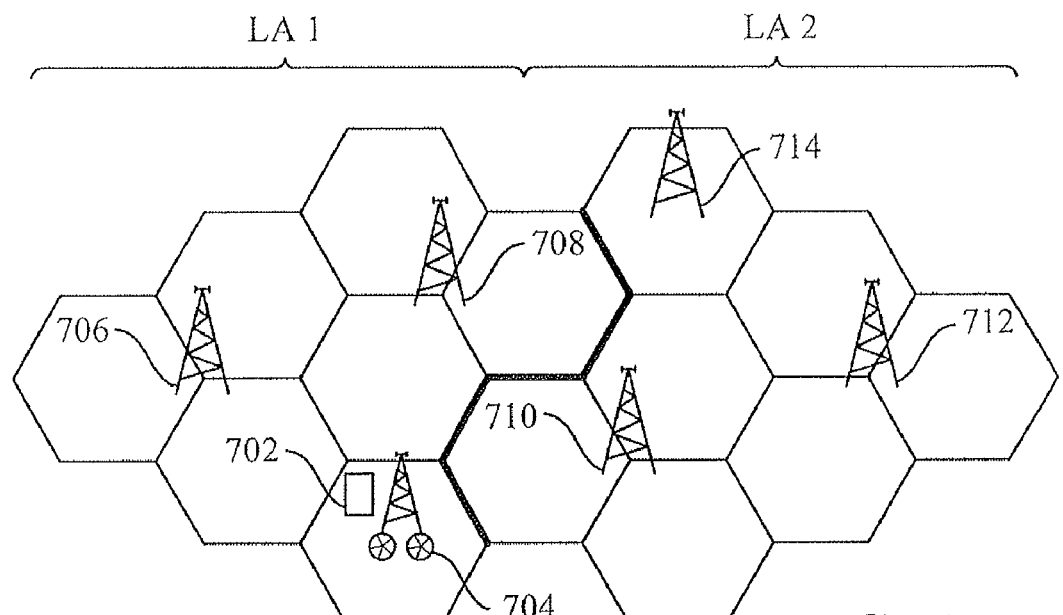
FIG. 7 schematically illustrates a cell plan with two Local Areas (LA), at least related to some embodiments of the present invention.

Reference will now also be given to FIG. 7 schematically illustrating a cell plan having two Location Areas (LAs), LA 1 and LA 2. In FIG. 7, the UE to be positioned is denoted with 702 and the mobile base station serving said UE 702 is denoted with 704. Within the Location Area of the UE 702, there are detected two other base stations, 706 and 708. The positioning node can now determine whether there is a cell with a location known by the positioning node which cell has the same LAC as the serving cell, in step 524. In other words, whether there is cell within LA 1, with a location that is known to the positioning node. It should be mentioned that the LAC can be derived from the CGI or the SAI.

Also, as illustrated in FIG. 7, base stations 710, 712 and 714 serve cells located in Location Area 2, for which reason the location of these base stations are not preferred as a reference location for AGPS positioning of the UE residing in Location Area 1.

In the case there is a cell known by the positioning node which has the same LAC as the serving cell, the positioning node can now identify the cell in step 526, and set the reference location to the latitude and longitude of the base station location of said identified cell in step 528. This ensures that the reference location given is located within the same geographical area.

Even if service degradation might occur, the chip in the UE might very well be able to get an AGPS fix or perform pseudo range measurements without service degradation. AGPS quality of service will depend on the quality and performance of the GPS chip, the surrounding terrain, and how far from the given reference location the UE actually is.

Step C—Fixed Points in Serving Area

As a last resort in case steps A and B are not applicable to determine a reference location, a fixed point within the geographical area served by a positioning node can be used as reference location.

Typically in GSM, a positioning node in the form of a Serving Mobile Location Center (SMLC) serves a number of BSCs deployed in the same geographical region consisting of several Location Areas, LAs. The area covered by these LAs is the area serviced by this particular SMLC. In UMTS, the same approach can be used regardless if there is a Radio Network Controller (RNC) centric or Stand Alone SMLC (SAS) centric architecture for the positioning.

The location of the fixed point can be manually configured in the positioning node and the coordinates for it chosen to maximize yield when planning for AGPS deployment.

Thus, in the case there are no cells known by the positioning node which has the same LAC as the serving cell, the positing node can now derive a reference location according to step C. The positioning node can now obtain the geographical area that is served by the positioning node, in step 530, i.e. the serving area of the positioning node. The location of the reference position is chosen based on the population distribution within the serving area.

Figure 8:
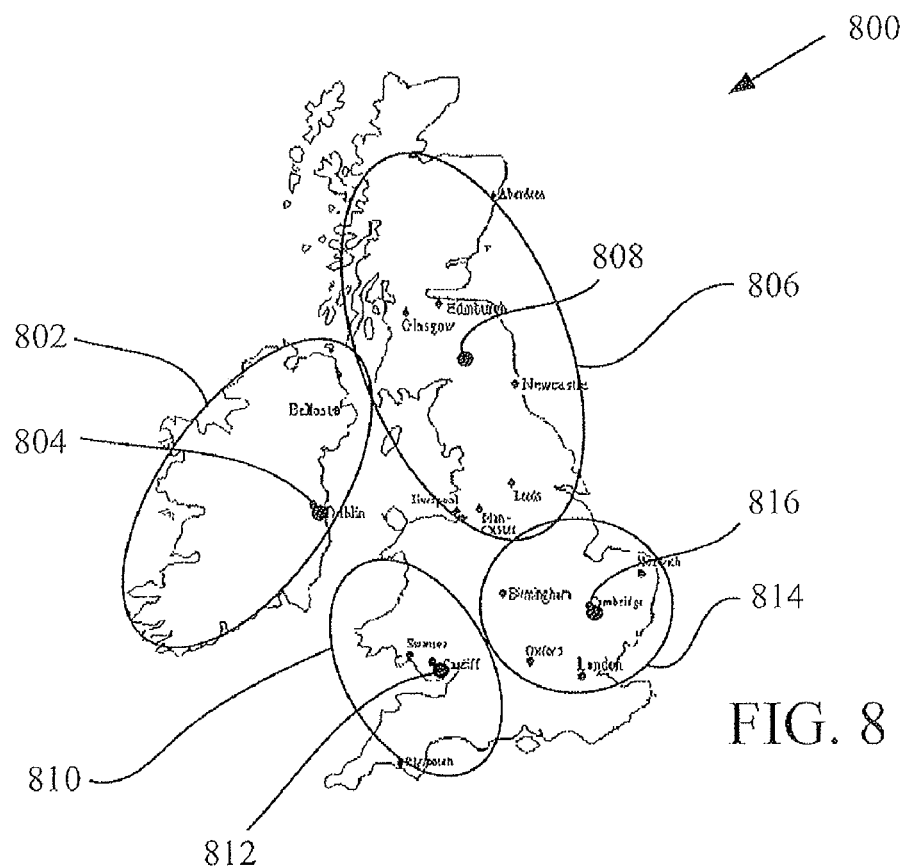
FIG. 8 illustrates a plurality of serving areas within a geographic area, at least related to some embodiments of the present invention.

Reference will now be given to FIG. 8 schematically illustrating various geographical serving areas 802, 806, 810 and 814. In one serving area 802, the reference position can be determined to be the position where the population density is the highest, for which reason the number of positioning attempts is expected to be highest. In this example the reference position 804 it is chosen to be Dublin.

In a second serving area 806, the reference position 808 is chosen to be the geographical or spatial centre of the serving area. This may be advantageous where the distribution of people and mobile phones is at least approximately evenly spread.

In a third serving area 810, the reference position 812 can be chosen to be a location between the geographical centre of the serving area 810 and the location where the positioning attempts are expected to be highest.

Similarly, in a fourth serving area 814, the reference position 816 is chosen to a location which is a fair mixture of the geographical centre and the highest density of expected positioning attempts.

Thus, in step 532 the positioning node can identify a fixed point of the serving area. Thereafter, the reference position is set to the fixed point in step 534.

The positioning node may at least according to some embodiments includes a database or another electronic information store, which comprises geographic location information for one or more fixed references within one or more given network serving areas.

When a fixed point can be determined found, typical service degradation would be longer Time To First Fix due to possible delays for the extra algorithmic iterations needed for a fix, compared to if using a more accurate starting point. Degraded accuracy caused by transaction deadlines cutting the algorithms short before they have completed all iterations is also possible. The worst symptom would be decreased yield caused by an increased number of transaction timeouts where the portable communication device still has nothing to deliver.

However, with the alternative being complete failure for all positioning attempts within an unknown cell, even one successful AGPS position derived from a serving area reference location is an infinite improvement. And in favorable environments such as open rural landscapes, the success rate should be fairly high.

Thus after either one of steps A, B and C, the positioning node can now use the reference location, in step 536. Having determined the reference location the positioning node can now respond to the location request as received in step 502, by sending the obtained reference location to the to the UE to be positioned, via either the RNC or the BSC in step 538. It should be mentioned that the reference location as sent to the UE is sent as part of assistance data further comprising ephemeris data.

A method for setting a reference location can also involve a self-learning mechanism. The latest AGPS position estimate derived from successful usage of either one of the first step, the second and the third step, can be stored and reused by the positioning system as a reference location for future AGPS attempts in the cell. In such a case, the location of said cell is thus no longer unknown by the positioning system, for which reason a reference location does not have to be determined by the positioning node. There is thus no need to apply the presented three-step approach to determine a reference location for AGPS positioning of device to be positioned. Rather the stored reference position can in this case be used for the AGPS positioning attempt.

However, since temporary cells are mobile, they might move to a different location. Therefore the storage and usage of such reference locations may be subjected to expiration timers and/or other qualifications, to guard against the use of stale or otherwise outdated information. Alternatively, manual housekeeping of the positioning node of cells, within which the portable communication device to be positioned reside, may be employed.

Now, if it is determined that there is a stored reference position of the serving cell in step 504 in the positioning node, the positioning node can retrieve the stored reference position of the cell in step 540, and use said stored position as the reference position for AGPS positioning of the mobile to position.

At least some of the presented embodiments bring a number of advantages of which a few are:

- The use of a resilient method of determining a reference location would dramatically increase AGPS success rate not only in temporary and/or mobile cells, but also in a normal operator network since OSS load cycles are not efficient in this regard, and several days might pass before a network change is fully reflected in distributed OSS data.
- For disaster areas, the need to determine a useful reference location for AGPS positioning is emphasized. The embodiments of the present invention as described herein would greatly enhance success rate of AGPS emergency positioning in such areas, which in turn could save lives.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method in a positioning node for providing a reference location estimate for Assisted Global Positioning System (AGPS) positioning of a portable communication device when a serving cell of the portable communication device is unknown to the positioning node, said method comprising:

receiving from the portable communication device via a network node a data list of cells that are neighbors to the serving cell;

determining whether the location of any one of the neighbor cells is known to the positioning node;
determining whether there is a cell in the data list of cells that has the same Location Area Code (LAC) as the serving cell of the portable communication device, based on whether the location of any one of the neighbor cells is known to the positioning node;
identifying a fixed point of location within a geographical area that is being served by the positioning node, based on whether the location of any one of the neighbor cells is known to the positioning node, and based on whether there is a cell in the data list of cells that has the same LAC as the serving cell of the portable communication device; and
setting the reference location estimate for AGPS positioning of the portable communication device, based at least on whether the location of any one of the neighbor cells is known to the positioning node.

2. The method according to claim 1, wherein the step of setting the reference location estimate comprises setting the reference location estimate for AGPS positioning of the portable communication device to the location of the base station of any one of the neighbor cells, in the case the location of the base station of said any one of the neighbor cells is known to the positioning node.

3. The method according to claim 1, wherein the step of setting the reference location estimate further is based on whether there is a cell in the data list of cells that has the same LAC as the serving cell of the portable communication device.

4. The method according to claim 3, wherein the step of setting the reference location estimate comprises setting the reference location estimate for AGPS positioning of the portable communication device to the location of the base station of the cell that has the same LAC as the serving cell of the portable communication device, in the case there exists such a cell and in the case the location of the base station of all neighbor cells is unknown to the positioning node.

5. The method according to claim 3, wherein the step of setting the reference location estimate further comprises setting the reference location estimate for the AGPS positioning of the portable communication device to the identified fixed point of location, in the case the location of the base station of all neighbor cells is unknown to the positioning node and the data list of cells does not comprise any cells with the same LAC as the serving cell.

6. The method according to claim 2, wherein the step of setting the reference location estimate further comprises identifying the cell from which a signal is strongest, among the neighbor cells known to positioning node, obtaining the location of the base station of the cell having the highest signal strength, and setting the reference location estimate to the location of the base station of said cell having the highest signal strength.

7. The method according to claim 3, wherein the step of determining whether there is a cell in the data list of cells that has the same LAC as the serving cell comprises obtaining the LAC of the serving cell of the portable communication device and obtaining the location of the base station of the cell in the data list of cells having the same LAC as the serving cell.

8. The method according to claim 4, wherein the step of determining whether there is a cell in the data list of cells that has the same LAC as the serving cell comprises obtaining the LAC of the serving cell of the portable communication device and obtaining the location of the base station of the cell in the data list of cells having the same LAC as the serving cell.

9. The method according to claim 1, wherein the step of identifying a fixed point of location within the geographical area that is served by the positioning node comprises determining the geographical area that is served by the positioning node.

10. The method according to claim 1, in which the positioning node is a Serving Mobile Location Center (SMLC).

11. A positioning node for providing a reference location estimate for Assisted Global Positioning System (AGPS) positioning of a portable communication device, when a serving cell of the portable communication device is unknown to the positioning node, said positioning node comprising: a transceiving unit configured to receive a request for a data list of cells that are neighbors to the serving cell, from a network node;
a processing unit configured to determine whether the location of any one of the neighbor cells is known to the positioning node, to determine whether there is a cell in the data list of cells that has the same Location Area Code (LAC) as the serving cell of the portable communication device, based on whether the location of any one of the neighbor cells is known to the positioning node; and
an identifying unit configured to identify a fixed point of location within a geographical area that is being served by the positioning node, based on whether the location of any one of the neighbor cells is known to the positioning node, and based on whether there is a cell in the data list of cells that has the same LAC as the serving cell of the portable communication device control unit;
wherein the processing unit further is configured to set the reference location estimate for AGPS positioning of the portable communication device, based at least on whether the location of the base station of any one of the neighbor cells is known to the positioning node.

12. The positioning node according to claim 11, wherein the transceiving unit, the processing unit and the identifying unit are interconnected with each other, and where the positioning node further comprises a control unit connected to, and further configured to control, said units.

13. The positioning node according to claim 11, wherein the processing unit further is configured to set the reference location estimate for AGPS positioning of the portable communication device to the location of the base station of any one of the neighbor cells, in the case the location of the base station of said any one of the neighbor cells is known to the positioning node.

14. The positioning node according to claim 11, wherein the processing unit further is configured to set the reference location estimate based on whether there is a cell in the data list of cells that has the same LAC as the serving cell of the portable communication device.

15. The positioning node according to claim 14, wherein the processing unit further is configured to set the reference location estimate for AGPS positioning of the portable communication device to the location of the base station of the cell that has the same LAC as the serving cell of the portable communication device, in the case there exists such a cell and in the case the location of the base station of all neighbor cells is unknown to the positioning node.

16. The positioning node according to claim 14, wherein the processing unit further is configured to set the reference location estimate for AGPS positioning of the portable communication device to the identified fixed point of location, in the case the location of the base station of all neighbor cells is unknown to the positioning node and the data list of cells does not comprise any cells with the same LAC as the serving cell.

17. The positioning node according to claim 13, wherein the processing unit further is configured to identify the cell from which a signal is strongest, among the neighbor cells known to positioning node, obtaining the location of the base station of the cell having the highest signal strength, and setting the reference location estimate to the location of the base station of said cell having the highest signal strength.

18. The positioning node according to claim 14, wherein processing unit configured to determine whether there is a cell in the data list of cells that has the same LAC as the serving cell, further is configured to obtain the LAC of the serving cell of the portable communication device and to obtain the location of the base station of the cell in the data list of cells having the same LAC as the serving cell.

19. The positioning node according to claim 11, wherein the identifying unit further is configured determining the geographical area that is served by the positioning node.

20. The positioning node according to claim 11, where the positioning node is a Serving Mobile Location Center (SMLC).

* * * * *